United States Patent
Kiwan et al.

(10) Patent No.: US 10,774,770 B2
(45) Date of Patent: Sep. 15, 2020

(54) METHOD AND SYSTEM FOR ENGINE KNOCK DETECTION

(71) Applicant: Ford Global Technologies, LLC, Dearborn, MI (US)

(72) Inventors: Rani Kiwan, Ann Arbor, MI (US); Christopher Paul Glugla, Macomb, MI (US); Mohannad Hakeem, Dearborn, MI (US); Amey Karnik, Canton, MI (US); James Matthew Kindree, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 16/171,247

(22) Filed: Oct. 25, 2018

(65) Prior Publication Data
US 2020/0132008 A1    Apr. 30, 2020

(51) Int. Cl.
*F02D 41/14* (2006.01)
*F02D 41/30* (2006.01)
*F02D 13/02* (2006.01)

(52) U.S. Cl.
CPC ..... *F02D 41/1497* (2013.01); *F02D 13/0215* (2013.01); *F02D 41/1401* (2013.01); *F02D 41/30* (2013.01); *F02D 2200/025* (2013.01)

(58) Field of Classification Search
CPC .. F02D 41/1497; F02D 41/30; F02D 41/1401; F02D 13/0215; F02D 2200/025
See application file for complete search history.

(56) References Cited

U.S. PATENT DOCUMENTS

| | | | |
|---|---|---|---|
| 9,759,145 | B2 | 9/2017 | Glugla et al. |
| 9,777,658 | B2 | 10/2017 | Nagashima et al. |
| 9,945,751 | B2 * | 4/2018 | Angeby .............. F02D 41/0002 |
| 2011/0132327 | A1 | 6/2011 | Aso et al. |

OTHER PUBLICATIONS

Hakeem, M. et al., "Method and System for Variable Displacement Engine Knock Control," U.S. Appl. No. 15/985,257, filed May 21, 2018, 77 pages.
Hakeem, M. et al., "Method and System for Adjusting Engine Knock Background Noise of a Variable Displacement Engine," U.S. Appl. No. 15/985,337, filed May 21, 2018, 75 pages.
Hakeem, M. et al., "Method and System for Adjusting Engine Knock Background Noise Levels," U.S. Appl. No. 15/985,428, filed May 21, 2018, 93 pages.
Kiwan, R. et al., "Method and System for Learning Contributions to an Engine Knock Background Noise Level," U.S. Appl. No. 16/122,065, filed Sep. 5, 2018, 49 pages.
Glugla, C. et al., "Method and System for Determining Piston Slap," U.S. Appl. No. 16/129,562, filed Sep. 12, 2018, 46 pages.

(Continued)

*Primary Examiner* — Xiao En Mo
(74) *Attorney, Agent, or Firm* — Geoffrey Brumbaugh; McCoy Russell LLP

(57) ABSTRACT

Methods and systems are disclosed for operating an engine that includes a knock control system. The method and system may increase opportunities to learn one or more engine knock background noise levels via changing poppet valve timing and/or fuel injection timing. The method and system may also improve knock detection if knock sensor degradation is suspected.

7 Claims, 9 Drawing Sheets

(56) References Cited

OTHER PUBLICATIONS

Glugla, C. et al., "Method and System for Determining Engine Knock Background Noise Levels," U.S. Appl. No. 16/144,762, filed Sep. 27, 2018, 56 pages.
Glugla, C. et al., "Method and System for Detecting Engine Knock During Transient Conditions," U.S. Appl. No. 16/155,394, filed Oct. 9, 2018, 48 pages.
Kiwan, R. et al., "Method and System for Applying Engine Knock Windows," U.S. Appl. No. 16/170,869, filed Oct. 25, 2018, 68 pages.
Kiwan, R. et al., "Method and System for Learning Contributions of Engine Knock Background Noise for a Variable Displacement Engine," U.S. Appl. No. 16/195,695, filed Nov. 19, 2018, 75 pages.

* cited by examiner

METHOD AND SYSTEM FOR ENGINE KNOCK DETECTION

FIELD

The present application relates to methods and systems for learning engine knock background noise levels.

BACKGROUND/SUMMARY

An engine may include an engine knock control system to increase engine efficiency and reduce the possibility of engine degradation. The knock control system may include a knock sensor that senses vibrations of the engine's block. The knock control system may observe particular frequencies output from the knock sensor to determine the presence or absence of engine knock. Engine knock or detonation may occur when end gases within the cylinder ignite before a flame front generated by a spark ignites the end gases during a cycle of a cylinder. The ignition of the end gases due to higher cylinder temperatures and pressures may stimulate vibration within the engine's block, which may be detected via the knock sensor. The knock system may determine that engine knock is present based on output of the knock sensor during a crankshaft interval where knock may be expected and an engine knock background noise level. The engine knock background noise level may reflect engine vibration when engine knock is not present. However, if the knock sensor degrades or if engine knock background noise level changes or varies from engine to engine, engine knock may not be observed by the control system or it may be falsely indicated by the control system. Therefore, it may be desirable to provide a way of operating the knock control system such that the possibility of missing knock or falsely indicating knock may be reduced.

The inventors herein have developed an engine operating method, comprising: sampling a first knock sensor in a knock window of a selected cylinder via a controller; and sampling a second knock sensor in the knock window of the selected cylinder via the controller in response to generating less than a threshold number of knock indications being generated from sampling of the first knock sensor in the knock window of the selected cylinder.

By sampling output of a second knock sensor in response to generating less than a threshold actual total number of engine knock indications being generated from sampling output of the first knock sensor, it may be possible to provide the technical result of improving engine knock detection during conditions where a knock sensor is degraded. Although the second knock sensor may not provide as desirable a signal to noise ratio as the first sensor with regard to detecting knock in a particular engine cylinder, it may provide a signal that is sufficient for detecting knock in the particular engine cylinder. The engine knock background noise level for the particular cylinder may be reassessed according to output of the second knock sensor. Additionally, the approach provides for adjusting fuel injector and poppet valve opening and closing times to provide additional ways to modify engine background noise levels so that engine knock detection may be improved.

The present description may provide several advantages. In particular, the approach may improve detection of engine knock. Further, the approach provides for increasing opportunities to learn engine knock background noise levels so that indications of engine knock may be more accurate. Further still, the approach may provide ways of changing engine knock background noise levels to improve signal to noise ratios for detecting engine knock.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
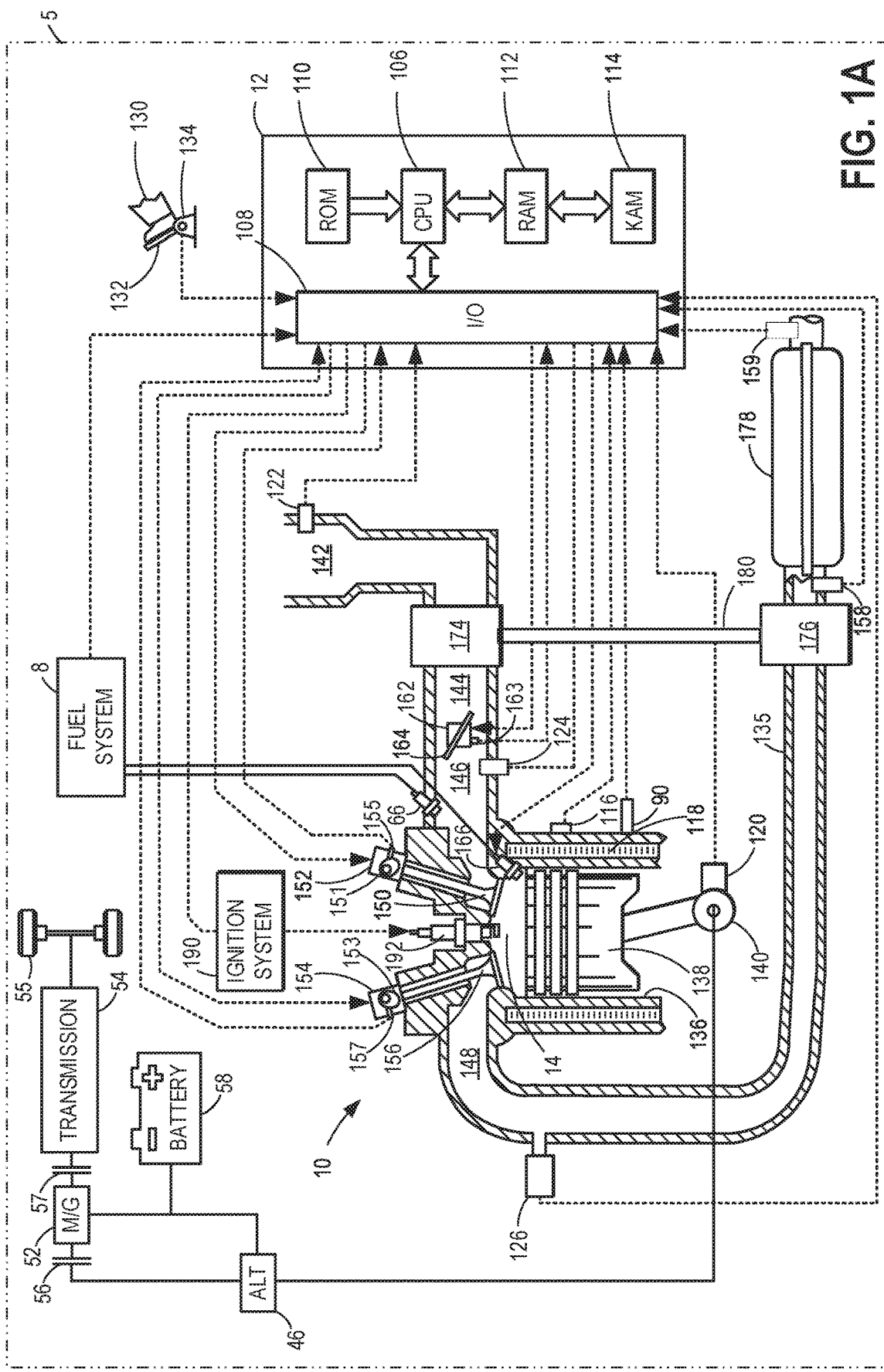
FIG. 1A shows a schematic depiction of an engine system of a vehicle.
Figure 1C:
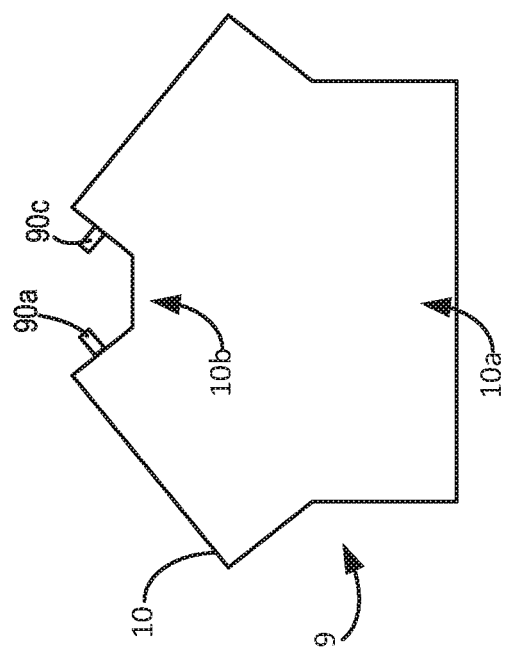
FIG. 1C shows an alternative view of knock sensor locations for the V8 engine.
Figure 1B:
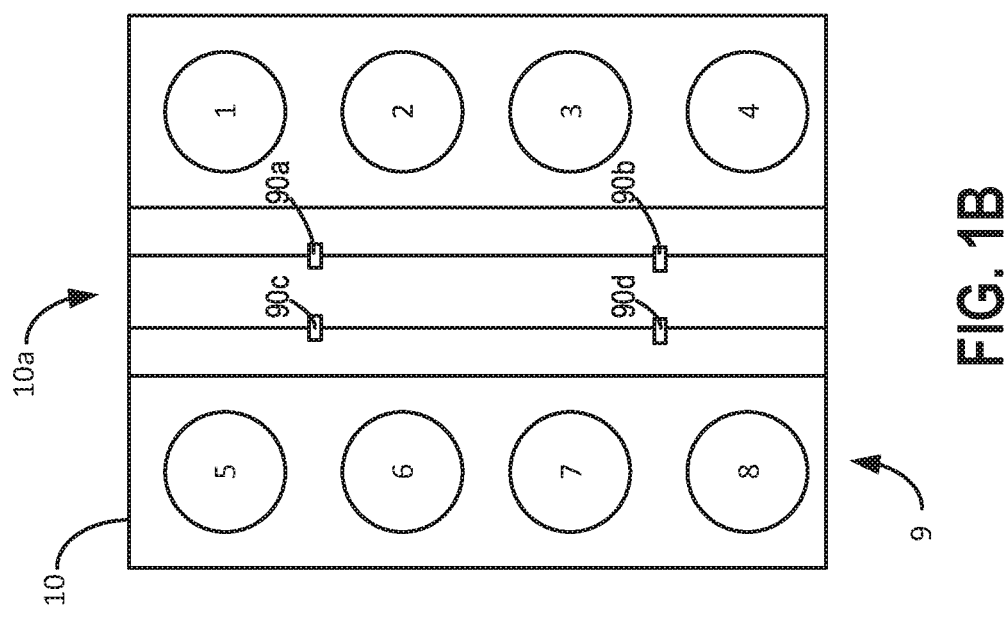
FIG. 1B shows example locations for knock sensors for a V8 engine.
Figure 2:
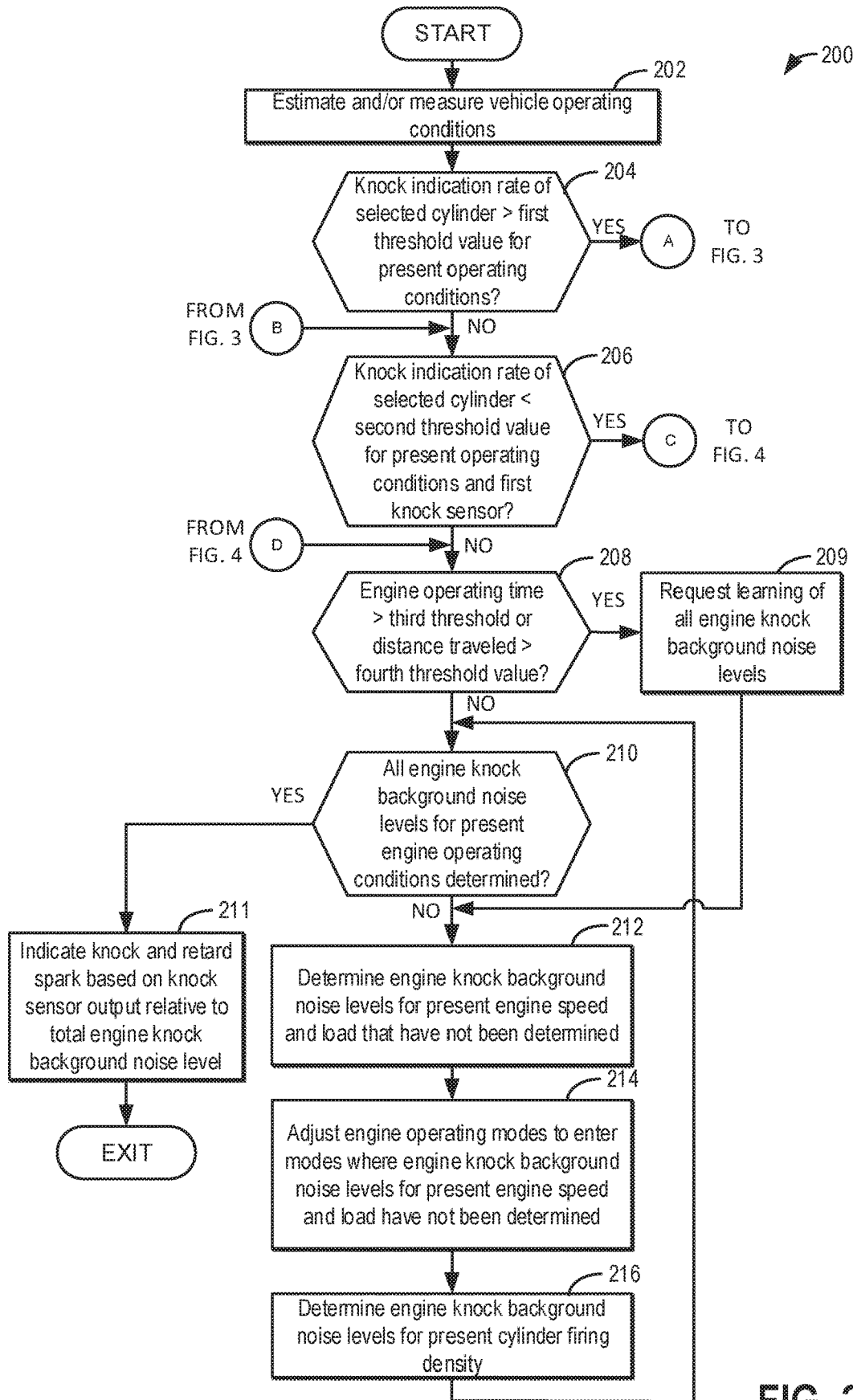
FIGS. 2-4 shows a high level flow chart of a way to improve engine knock background noise learning opportunities and accuracy of indicating engine knock.
Figure 3:
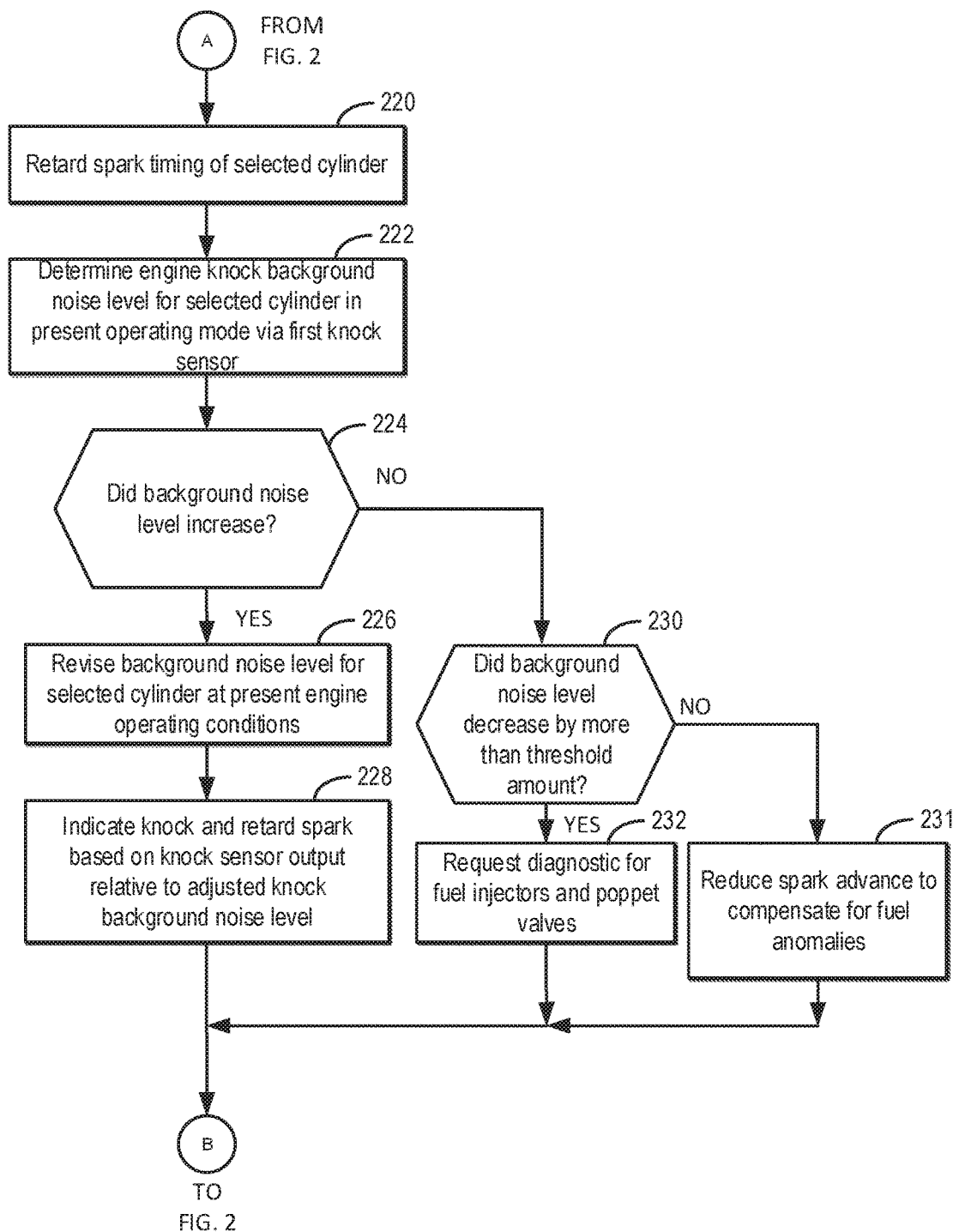
Figure 4:
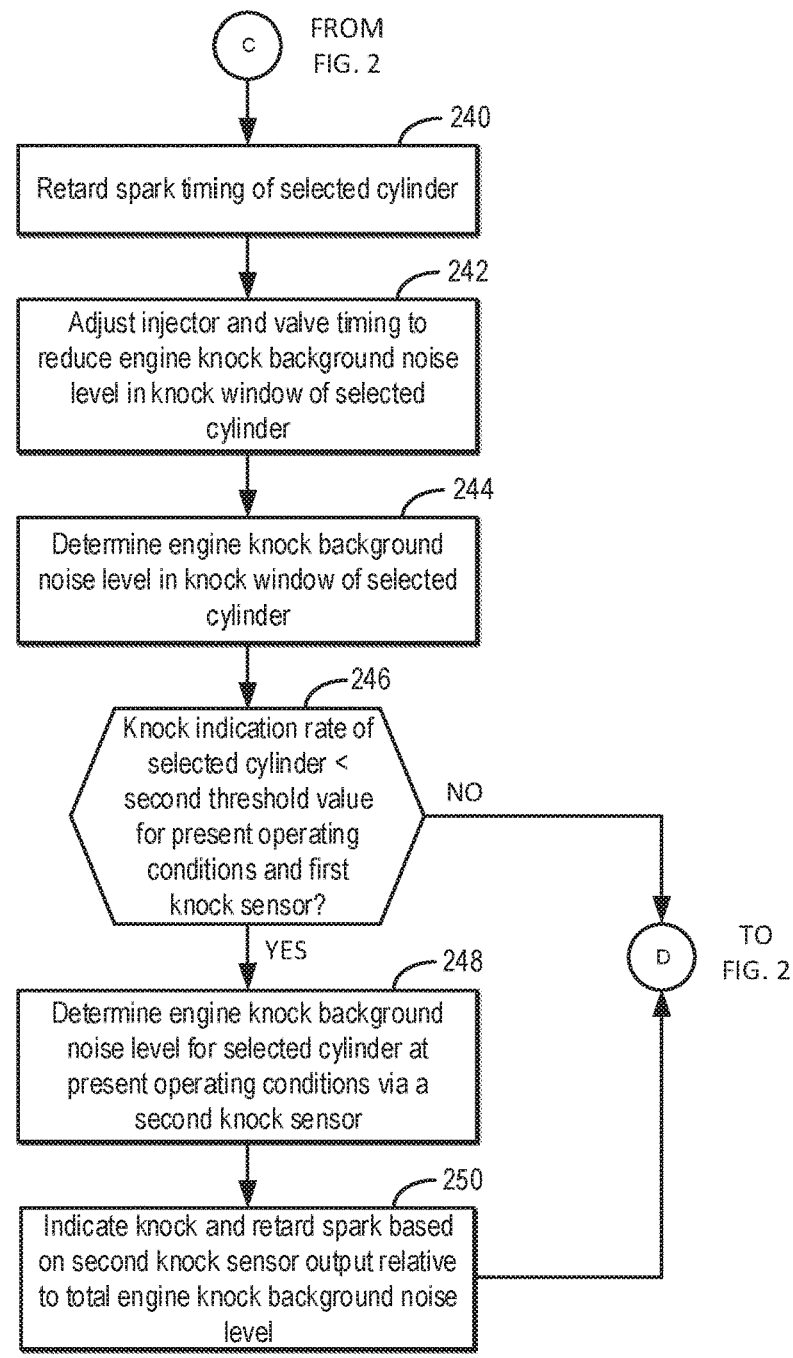

The following description relates to systems and methods for operating an engine that includes a knock control system. The engine may be of the type that is shown in FIGS. 1A-1C. The engine may be operated according to the method of FIGS. 2-4. The method may improve opportunities to learn engine knock background noise levels so that detection of engine knock may be improved. Further, the approach may improve engine knock detection in the presence of engine knock sensor degradation. The method of FIGS. 2-4 is at least partially illustrated in the engine operating sequences of FIGS. 5-8. It should be noted that the present description is not limited to the specific embodiments shown herein and it may be applied to engines that contain fewer or more engine cylinders.

Turning now to the figures, FIG. 1A depicts an example of a cylinder 14 of an internal combustion engine 10, which may be included in a vehicle 5. Engine 10 may be controlled at least partially by a control system, including a controller 12, and by input from a human vehicle operator 130 via an input device 132. Internal combustion engine 10, comprising one or more cylinders, one cylinder of which is shown in FIG. 1A, is controlled by electronic engine controller 12. The controller 12 receives signals from the various sensors shown in FIGS. 1A-1C. Controller 12 employs the actuators shown in FIGS. 1A-1C to adjust engine operation based on the received signals and instructions stored in memory of controller 12. In this example, input device 132 includes an accelerator pedal and a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1A shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1A, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1A, exhaust gas sensor 126 is a UEGO sensor. Emission control device 178 may be a three-way catalyst, a NOx trap, various other emission control devices, or combinations thereof. In the example of FIG. 1A, emission control device 178 is a three-way catalyst. Oxygen sensor 159 may monitor emission control device 178 for degradation.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

As further described herein, intake valve 150 and exhaust valve 156 may be deactivated during VDE mode via electrically actuated rocker arm mechanisms. In another example, intake valve 150 and exhaust valve 156 may be deactivated via a CPS mechanism in which a cam lobe with no lift is used for deactivated valves. Still other valve deactivation mechanisms may also be used, such as for electrically actuated valves. In one example, deactivation of intake valve 150 may be controlled by a first VDE actuator (e.g., a first electrically actuated rocker arm mechanism, coupled to intake valve 150) while deactivation of exhaust valve 156 may be controlled by a second VDE actuator (e.g., a second electrically actuated rocker arm mechanism, coupled to exhaust valve 156). In alternate examples, a single VDE actuator may control deactivation of both intake and exhaust valves of the cylinder. In still other examples, a single cylinder valve actuator deactivates a plurality of cylinders (both intake and exhaust valves), such as all of the cylinders in an engine bank, or a distinct actuator may control deactivation for all of the intake valves while another distinct actuator controls deactivation for all of the exhaust valves of the deactivated cylinders. It will be appreciated that if the cylinder is a non-deactivatable cylinder of the VDE engine, then the cylinder may not have any valve deactivating actuators. Each engine cylinder may include the valve control mechanisms described herein. Intake and exhaust valves are held in closed positions over one or more engine cycles when deactivated so as to prevent flow into or out of cylinder 14.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with a higher latent enthalpy of vaporization are used. The compression ratio may also be increased if direct injection is used due to its effect on engine knock.

Each cylinder of engine 10 may include a spark plug 192 for initiating combustion. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1A shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Fuel injectors 166 and 66 may be configured to receive different fuels from fuel system 8 in varying relative amounts as a fuel mixture and further configured to inject this fuel mixture directly into cylinder. For example, fuel injector 166 may receive alcohol fuel and fuel injector 66 may receive gasoline. Further, fuel may be delivered to cylinder 14 during different strokes of a single cycle of the cylinder. For example, directly injected fuel may be delivered at least partially during a previous exhaust stroke, during an intake stroke, and/or during a compression stroke. Port injected fuel may be injected after intake valve closing of a previous cycle of the cylinder receiving fuel and up until intake valve closing of the present cylinder cycle. As such, for a single combustion event (e.g., combustion of fuel in the cylinder via spark ignition), one or multiple injections of fuel may be performed per cycle via either or both injectors. The multiple DI injections may be performed during the compression stroke, intake stroke, or any appropriate combination thereof in what is referred to as split fuel injection.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of alcohol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1A as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 135; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; oxygen sensor 159; engine vibrations (e.g., caused by knock) via vibration sensing knock sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature and infer a temperature of emission control device 178 based on the signal received from temperature sensor 158.

Controller 12 receives signals from the various sensors of FIG. 1A and employs the various actuators of FIG. 1A to adjust engine operation based on the received signals and instructions stored on a memory of the controller. For example, the controller may transition the engine to operating in VDE mode by actuating valve actuators 152 and 154 to deactivate selected cylinders, as further described with respect to FIG. 5.

As described above, FIG. 1A shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1A with reference to cylinder 14.

During selected conditions, such as when the full torque capability of engine 10 is not requested, one of a first or a second cylinder group may be selected for deactivation by controller 12 (herein also referred to as a VDE mode of operation). During the VDE mode, cylinders of the selected group of cylinders may be deactivated by shutting off respective fuel injectors 166 and 66. Further, valves 150 and 156 may be deactivated and held closed over one or more engine cycles. While fuel injectors of the disabled cylinders are turned off, the remaining enabled cylinders continue to carry out combustion, with corresponding fuel injectors and intake and exhaust valves active and operating. To meet torque requirements, the controller adjusts the amount of air entering active engine cylinders. Thus, to provide equivalent engine torque that an eight cylinder engine produces at 0.2 engine load and a particular engine speed, the active engine cylinders may operate at higher pressures than engine cylinders when the engine is operated with all engine cylinders being active. This requires higher manifold pressures, resulting in lowered pumping losses and increased engine efficiency. Additionally, the lower effective surface area (from only the active cylinders) exposed to combustion reduces engine heat losses, increasing the thermal efficiency of the engine.

Referring now to FIG. 1B, a plan view of engine 10 is shown. Front 10a of engine 10 may include a front end accessory drive (FEAD) (not shown) to provide power to an alternator, power steering system, and air conditioning compressor. In this example, engine 10 is shown in a V8 configuration with eight cylinders that are numbered 1-8. Engine knock may be sensed via four knock sensors 90a-90d. The knock sensors are positioned in the valley of engine block 9. In this example, output of knock sensor 90a is sampled via controller 12 during the knock windows (e.g., crankshaft angular intervals) of engine cylinders one and two. Thus, knock sensor 90a is associated with cylinders one and two. However, if knock sensor 90a (the primary knock sensor of cylinder numbers one and two) is suspected of being degraded, output of knock sensor 90b (the secondary knock sensor of cylinder numbers one and two) may be sampled or measured in knock windows associated with engine cylinder numbers one and two. Output of knock sensor 90b is sampled via controller 12 during the knock windows of engine cylinders three and four. However, if knock sensor 90b (the primary knock sensor of cylinder numbers three and four) is suspected of being degraded, output of knock sensor 90a (the secondary knock sensor of cylinder numbers three and four) may be sampled or measured in knock windows associated with engine cylinder numbers three and four. Thus, knock sensor 90b is associated with cylinders three and four. Output of knock sensor 90c is sampled via controller 12 during the knock windows of engine cylinders five and six. Thus, knock sensor 90c is associated with cylinders five and six. However, if knock sensor 90c (the primary knock sensor of cylinder numbers five and six) is suspected of being degraded, output of knock sensor 90d (the secondary knock sensor of cylinder numbers five and six) may be sampled or measured in knock windows associated with engine cylinder numbers five and six. Output of knock sensor 90d is sampled via controller 12 during the knock windows of engine cylinders 7 and 8. Thus, knock sensor 90d is associated with cylinders seven and eight. However, if knock sensor 90d (the primary knock sensor of cylinder numbers seven and eight) is suspected of being degraded, output of knock sensor 90c (the secondary knock sensor of cylinder numbers seven and eight) may be sampled or measured in knock windows associated with engine cylinder numbers seven and eight. The plurality of knock sensors improves the ability to detect knock for each cylinder since attenuation of engine vibrations from knock increases as the distance from the knocking cylinder to the knock sensor increases. Knock sensor output is not sampled when the knock windows are closed.

Referring now to FIG. 1C, a front view of engine 10 is shown. Engine block 9 includes a valley 10b where engine knock sensors 90a and 90c are mounted to block 9. By mounting knock sensors 90a and 90c in the valley 10b, a good signal to noise ratio may be available so that knock may be more reliably detected. However, the mounting locations of knock sensors 90a-90d may also allow some fuel injector control actions to be observed by some sensors and not by others. Thus, background noise levels of some cylinders may be higher or lower than other cylinders. Additionally, the distance of a fuel injector that opens or closes near a knock window of another engine cylinder may affect an amount of time that it takes for a vibration to travel from the operating fuel injector to the knock sensor. And, a longer time for the vibration to travel from the fuel injector to the knock sensor may allow the vibration to enter a knock window for a cylinder. As such, knock sensor location, firing order, and engine configuration may also affect engine knock background noise levels for some engine cylinders.

Thus, the system of FIGS. 1A-1C provides for a system for operating an engine, comprising: an engine including at least one vibration sensing engine knock sensor; and a controller including executable instructions stored in non-transitory memory to adjust poppet valve timing of the engine via the controller in response to a request to learn one or more engine knock background noise levels. The system further comprises additional instructions to adjust fuel injector timing in response to the request to the request to learn one or more engine knock background noise levels. The system includes where the request to learn one or more engine knock background noise levels is based on a distance traveled by a vehicle. The system includes where the request to learn one or more engine knock background noise levels is based on an amount of time the engine has operated since manufacturing of the engine. The system further comprises additional instructions to adjust a cylinder firing pattern in response to the request to learn one or more engine knock background noise levels. The system further comprises additional instructions to adjust a cylinder firing density in response to the request to learn one or more engine knock background noise levels.

Referring now to FIGS. 2-4, a method for operating an engine is shown. The method of FIGS. 2-4 may be included in and may cooperate with the system of FIGS. 1A-1C. At least portions of method 200 may be incorporated in the system of FIGS. 1A-1C as executable instructions stored in non-transitory memory. In addition, other portions of method 200 may be performed via a controller transforming operating states of devices and actuators in the physical world. The controller may employ engine actuators of the engine system to adjust engine operation. Further, method 200 may determine selected control parameters from sensor inputs. The engine may be rotating and combusting fuel when the method of FIGS. 2-4 is performed.

At 202, method 200 determines vehicle and engine operating conditions via the sensors described in FIG. 1A-1C. Method 200 may determine operating conditions including but not limited to engine speed, engine load, engine temperature, ambient temperature, fuel injection timing, knock sensor output, fuel type, fuel octane, engine position, engine air flow, change in cylinder air flow, and change in engine speed. Method 200 proceeds to 204.

At 204, method 200 judges if an engine knocking rate (e.g., an actual total number of knock indications for a selected engine cylinder in a specified time or distance traveled interval (10 indications of knock in cylinder number one in five minutes)) of a selected cylinder (e.g., cylinder j, where j is the cylinder number) or an actual total number of knock indications for the selected cylinder is greater than a first threshold value for present engine speed and engine load. Method 200 may record indications of knock in each cylinder and determine an amount of time it took for the indications of knock to occur for the selected cylinder. If method 200 judges that the engine knocking rate of a selected cylinder or an actual total number of knock indications for the selected cylinder is greater than a first threshold value for present engine speed and engine load, then the answer is yes and method 200 proceeds to 220. Otherwise, the answer is no and method 200 proceeds to 206. A request to diagnose or adjust the engine knock background noise levels for the selected cylinder may be generated when method 200 judges that an engine knocking rate of the selected cylinder or an actual total number of knock indications for the selected cylinder is greater than a first threshold value for present engine speed and engine load.

At 206, method 200 judges if an engine knocking rate of a selected cylinder or an actual total number of knock indications for the selected cylinder is less than a second threshold value for present engine speed and engine load. If method 200 judges that the engine knocking rate of a selected cylinder or an actual total number of knock indications for the selected cylinder is less than a second threshold value for present engine speed and engine load, then the answer is yes and method 200 proceeds to 240. Otherwise, the answer is no and method 200 proceeds to 208. A request to diagnose or adjust the engine knock background noise levels for the selected cylinder may be generated when method 200 judges that an engine knocking rate of the selected cylinder or an actual total number of knock indications for the selected cylinder is less than a second threshold value for present engine speed and engine load.

At 208, method 200 judges if an engine operating time (e.g., a total amount of time the engine has been combusting fuel since the engine was manufactured) exceeds a third threshold value or if a distance traveled by a vehicle (e.g., a total distance that the vehicle as traveled since the vehicle was manufactured) that includes the engine exceeds a forth threshold value. If method 200 judges that an engine operating time exceeds the third threshold value or if a distance traveled by a vehicle that includes the engine exceeds a forth threshold value, then the answer is yes and method 200 proceeds to 209. Otherwise, the answer is no and method 200 proceeds to 210. A request to adjust the engine knock background noise levels for the selected cylinder may be generated when method 200 judges that an engine operating time exceeds a third threshold value or if a distance traveled by a vehicle that includes the engine exceeds a forth threshold value.

At 210, method 200 judges if all engine knock background noise levels for the present engine speed and load have been determined. The engine knock background noise levels may include but are not limited to the following engine knock background noise levels for conditions when all engine cylinders are operating: the total engine knock background noise level (Cyl_bkg_noise(j)), engine knock base noise level (Cyl_base_noise(j)) that does not include noise from poppet valves or fuel injectors closing during a knock window of cylinder (j), engine knock injector closing noise level (Cyl_inj_cnoise(j)) that does not include base engine noise or poppet valve noise during the knock window of cylinder (j), engine knock injector opening noise level (Cyl_inj_onoise_(j)) that does not include base engine noise or poppet valve noise during the knock window of cylinder (j), engine intake poppet valve noise level (Cyl_ivlv_noise (j)) that does not include base engine noise or fuel injector opening or closing noise generated during the knock window of cylinder (j), engine exhaust poppet valve noise level (Cyl_evlv_noise(j)) that does not include base engine noise or fuel injector opening or closing noise generated during the knock window of cylinder (j), and where j is the cylinder number of the engine.

In addition, method 200 may judge if engine knock background noise levels (e.g., Cyl_bkg_noise(j), Cyl_base_noise(j), Cyl_inj_cnoise(j), Cyl_inj_onoise_(j), Cyl_ivlv_noise(j), and Cyl_evlv_noise(j)) specifically applied to each engine operating mode that is available at the present engine speed and load including but not limited to cylinder firing patterns (e.g., firing an eight cylinder engine in a four cylinder mode with a firing order of 1-7-6-4-1-7-6-4), cylinder firing fraction or density (e.g., cylinder firing fraction is an actual total number of cylinder firing events (e.g., combustion in a cylinder during a cycle of the cylinder) divided by an actual total number of cylinder compression strokes over a predetermined actual total number of cylinder compression strokes), split fuel injection (e.g., where one or more fuel injectors inject fuel twice or more to a cylinder during a cycle of the cylinder), direct injection only mode (e.g., where fuel is injected to a cylinder only via a direct injector and not via a port injector during a cycle of the cylinder), port injection only mode (e.g., where fuel is injected to a cylinder only via a port injector and not via a direct injector during a cycle of the cylinder), and port and direct fuel injection mode (e.g., where fuel is injected to a cylinder via a direct injector and a port injector during a cycle of the cylinder) have been determined. Note that unique engine knock background noise levels may be provided for each cylinder firing pattern, cylinder firing density, split fuel injection, direct injection only mode, port injection only mode, and port and direct fuel injection mode since engine knock background noise levels may be influenced by unique fuel injector noise and unique poppet valve noise in each of these engine operating modes.

Engine knock background noise levels for the present engine speed and load may be stored in tables and/or functions. A byte of data that indicates whether or not the particular table or function entry has been learned in the past for the present engine speed and engine load may be included in memory for each table entry or function entry. If method 200 judges that all the engine knock background noise levels for the present engine speed and engine load have been adjusted, then the answer is yes and method 200 proceeds to 211. Otherwise, the answer is no and method 200 proceeds to 212.

At 211, method 200 assesses whether or not knock should be indicated for the selected cylinder that is being evaluated for engine knock (e.g., cylinder j). In one example, method 200 computes a knock intensity value for cylinder j by integrating sampled output of the knock sensor during the knock window of cylinder j and dividing the integrated knock sensor output by the total engine knock background noise level of cylinder j for the present engine speed and engine load. If the knock intensity value exceeds a threshold value (e.g., 2), then knock is indicated for the cylinder j and spark timing for the cylinder j is retarded by a predetermined amount. The spark is retarded for cylinder j and then the spark timing is advanced back toward the MBT (minimum spark advance for best engine torque at the present engine speed and load) spark timing for cylinder j. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the cylinder remains at its requested or base timing (e.g., knock limited spark timing or MBT timing). The presence or absence of engine knock for each cylinder may be determined in this way. The cylinder number j may be adjusted according to an engine firing order each engine cycle (e.g., two revolutions) so that knock is evaluated for each engine cylinder each engine cycle. Method 200 proceeds to exit after adjusting engine spark timing in cylinder j for engine knock.

At 212, method 200 determines engine knock background noise levels for the present engine speed and load for which values have not been determined. As described at 210, engine knock background noise levels for the present engine speed and load may be stored in tables and/or functions. A byte of data that indicates whether or not the particular table or function entry has been learned in the past for the present engine speed and engine load may be included in memory for each table entry or function entry. If one or more engine knock background noise levels, including engine knock background noise levels for particular cylinder firing patterns, cylinder firing densities, fuel injection modes, and poppet valve modes has not been determined or has been subject to a request to relearn the value stored therein, then the engine knock background noise level entries in the table or function are identified and marked for being learned. The entries of the tables or function may be individually numbered and method 200 may begin learning engine knock background noise levels of low numbered entries. Method 200 may learn engine knock background noise level entries in the tables or functions in ascending order from low numbered entries to high numbered entries. Method 200 may increment the entry number until all engine knock background noise level entries that are desired to be learned have been learned. Engine knock background noise levels may be learned for each engine cylinder. Method 200 proceeds to 214 after identifying engine knock background noise levels that are to be learned.

At 214, method 200 adjusts engine operating modes so that engine knock background noise levels that may be associated with the engine operating modes may be learned. The engine knock background noise levels may be learned for engine operating modes that are available for the present engine speed and engine load. Available engine operating modes include engine operating modes that may provide the requested driver demand torque or engine load at the present engine speed. Thus, if the engine is a four stroke V8 engine that may operate with two active (e.g., combustion in the cylinders) cylinders and six deactivated cylinders to meet the present driver demand torque at the present engine speed, then one or more two cylinder operating modes may be available to be engaged to operate the engine. Further, if learning of engine knock background noise levels is requested for a four stroke V8 engine having an all cylinder operating firing order of 1-3-7-2-6-5-4-8, the engine being available to operate in a variable displacement mode where the engine operates with four cylinders combusting fuel and four cylinders deactivated with a firing order of 1-7-6-4, then four of the engine's cylinders may be deactivated so that the engine operates with four active cylinders and a firing order of 1-7-6-4. The engine knock background noise levels may be learned for four or all eight cylinders when the engine is operated with four active cylinders. In particular, engine knock background noise levels may be learned for the four combusting cylinders and for the four cylinders that are not combusting.

The knock windows of the deactivated cylinders are free and unutilized to detect knock in the deactivated cylinders (as no combustion is taking place), and therefore can be reused to measure engine knock background noise that may or may not include injector and/or valve noises from the activated cylinders. The knock windows of the activated cylinders are utilized to detect knock (in the activated cylinders). But the knock window of an activated cylinder can be freed if needed by retarding its spark timing so non-knocking conditions are ensured, and reused to measure engine knock background noise that may or may not include injector and/or valve noises from the other activated cylinders.

The engine's operating mode may be changed to learn engine knock background noise levels that have not been previously learned so that opportunities to learn engine knock background noise levels may be increased. Changing the engine's operating mode may include but is not limited to changing the engine's fuel injection mode (e.g., port injection (PI) only, direct injection (DI) only, DI and PI, split injection), changing intake and exhaust poppet valve timing, and changing the engine cylinder firing density or cylinder firing pattern. By changing the engine's operating mode, engine knock background noise levels that may otherwise not be learned, may be learned. For example, for a V8 engine with firing order 1-3-7-2-6-5-4-8, the direct injection of cylinder i may fall into the knock window of cylinder j where cylinder j fires 3 events (270 crank angle degrees) after cylinder i (e.g., i=1 and j=2). To learn the injector noise of cylinder j (e.g., 2) interfering with the knock window of cylinder i (e.g., 1) cylinder j (e.g., 2) may be activated and cylinder i (e.g., 1) may be deactivated (to avoid knocking of cylinder i to affect the knock background noise). This case is not encountered when the V8 engine operates at a firing density of ⅔. Changing the firing density to ¾ (while maintaining same torque demand) will allow learning of injector noise of cylinder j. Method 200 proceeds to 216.

At 216, method 200 determines engine knock background noise levels via filtering and integrating engine knock sensor output that occurs during the engine knock window of the selected cylinder. For example, output of a particular knock sensor may be sampled or measured and integrated while a knock window of a particular cylinder is open. The integrated value may be an engine knock base noise level or another engine knock noise level. Further, the present engine knock background noise level may be constructed from an average of a predetermined number of past engine knock background noise levels for the selected cylinder. The engine may enter a new operating mode for each engine knock background noise level in the table or function that is requested to be learned, and each engine knock background noise level in the table or function may be learned from sampling and integrating output of a knock sensor during at least a portion of a cylinder knock window. Method 200 returns to 210 after determining the background noise level for each engine knock background noise entry that has been requested to be learned.

At 209, method 200 requests that all engine knock background noise levels be relearned. Thus, each entry of the tables or functions that contain engine knock background noise levels may be marked as an entry that is to be learned. Once an entry in a table or function is learned, it may be marked as learned so that it is not relearned unless it is requested to be learned again. Method 200 proceeds to 212.

At 220, method 200 retards spark timing of a selected cylinder. The selected cylinder may be a cylinder for which it is desired to determine engine knock background noise levels (e.g., Cyl_bkg_noise(j), Cyl_base_noise(j), Cyl_in-j_cnoise(j), Cyl_inj_onoise_(j), Cyl_ivlv_noise(j), and Cyl_evlv_noise(j)). The spark timing of the selected cylinder is retarded so that knock does not occur in the selected cylinder so that the engine knock background noise levels may be reliable. Method 200 proceeds to 222.

At 222, method 200 determines engine knock background noise levels for the present engine operating conditions (e.g., engine speed, engine load, and engine operating mode) via filtering and integrating engine knock sensor output that occurs during the engine knock window of the selected cylinder. The integrated value may be an engine knock base noise level or another engine knock noise level. Further, the present engine knock background noise levels may be constructed from an average of a predetermined number of past engine knock background noise levels for the selected cylinder. Method 200 proceeds to 224 after engine knock background noise levels for the selected cylinder have been learned.

At 224, method 200 judges if one or more of the engine knock background noise levels determined at 222 is greater than one or more of the engine knock background noise levels presently associated with the present engine operating conditions. For example, if the previously determined value of Cyl_base_noise for the selected cylinder at the present engine operating conditions is 0.5 and the value of Cyl_base_noise determined at 222 for the selected cylinder at the present engine operating conditions is 0.75, then the answer is yes and method 200 proceeds to 226. If method 200 judges that one or more of the engine knock background noise levels determined at 222 is greater than one or more of the engine knock background noise levels presently associated with the present engine operating conditions, then the answer is yes and method 200 proceeds to 226. Otherwise, the answer is no and method 200 proceeds to 230.

A yes answer may be indicative of one or more engine knock background noise levels being lower than is desired. This may allow the control system to generate more engine knocking indications than may be expected. Note that a greater number of knock events may be indicated if the engine background noise level is lower than is expected because integrated knock sensor output is divided by the engine knock background noise level. A no answer may be indicative of fuel injector degradation or intake/exhaust poppet valve operation degradation.

At 226, method 200 replaces the values of engine knock background noise levels for present engine operating conditions with values determined at 222. The new engine knock background noise levels may reduce the actual total number of engine knock indications since the engine knock background noise levels are increased. Method 200 proceeds to 228.

At 228, method 200 assesses whether or not engine knock should be indicated for the selected cylinder based on the newly determined engine knock background noise levels (e.g., the total engine knock background noise level for the selected cylinder, which includes base, injector, and poppet valve noise levels). In one example, method 200 computes a knock intensity value for the cylinder by integrating sampled output of the knock sensor during the knock window of cylinder and dividing the integrated knock sensor output by the total engine knock background noise level for the selected cylinder. If the knock intensity value exceeds a threshold value (e.g., 2), then knock is indicated for the selected cylinder and spark timing for the selected cylinder may be retarded by a predetermined amount. The spark is retarded for the selected cylinder and then the spark timing is advanced back toward the MBT (minimum spark advance for best engine torque at the present engine speed and load) spark timing for the selected cylinder. For example, if the knock intensity value for cylinder number one exceeds a threshold level, then knock is indicated for cylinder number one and spark timing of cylinder number one is retarded by five crankshaft degrees. The spark timing for cylinder number one may be advanced by five crankshaft degrees within ten seconds of when the spark timing of cylinder number one was retarded based on knock. If knock is not indicated, spark timing for the selected cylinder remains at its requested or base timing (e.g., knock limited spark timing or MBT timing). Knock for each cylinder may be determined in this way. Method 200 proceeds to exit after indicating or not indicating knock for the selected cylinder.

At 230, method 200 judges if one or more of the engine knock background noise levels determined at 222 decreased by more than a threshold amount. For example, if the previously determined value of Cyl_base_noise for the selected cylinder at the present engine operating conditions is 0.5 and the value of Cyl_base_noise determined at 222 for the selected cylinder at the present engine operating conditions is 0.25, then it may be determined that the engine knock background noise level has decreased by more than a threshold amount (e.g., 0.1). If method 200 judges that one or more of the engine knock background noise levels determined at 222 has decreased from one or more of the engine knock background noise levels presently associated with the present engine operating conditions by more than a threshold amount, then the answer is yes and method 200 proceeds to 232. Otherwise, the answer is no and method 200 proceeds to 231. A yes answer may be indicative of fuel injector or poppet valve degradation.

At 232, method 200 request diagnostics for fuel injectors and/or poppet valves. For example, method 200 may request an increase or decrease in the amount of fuel injected via a fuel injector to determine if the fuel injector is operating as desired. Further, method 200 may request advancing or retarding of intake and/or exhaust valves to determine if valve timing is moving as commanded. Method 200 proceeds to exit.

At 231, method 200 may adjust spark timing to compensate for fuel properties (e.g., low fuel octane). By retarding the spark timing for engine cylinders, engine knock that may be related to fuels with especially low octane levels may be reduced. Method 200 proceeds to exit.

At 240, method 200 retards spark timing of a selected cylinder. The selected cylinder may be a cylinder for which it is desired to determine engine knock background noise levels (e.g., Cyl_bkg_noise(j), Cyl_base_noise(j), Cyl_in-j_cnoise(j), Cyl_inj_onoise_(j), Cyl_ivlv_noise(j), and Cyl_evlv_noise(j)). The spark timing of the selected cylinder is retarded so that knock does not occur in the selected cylinder so that the engine knock background noise levels may be reliable. Method 200 proceeds to 242.

Figure 7:
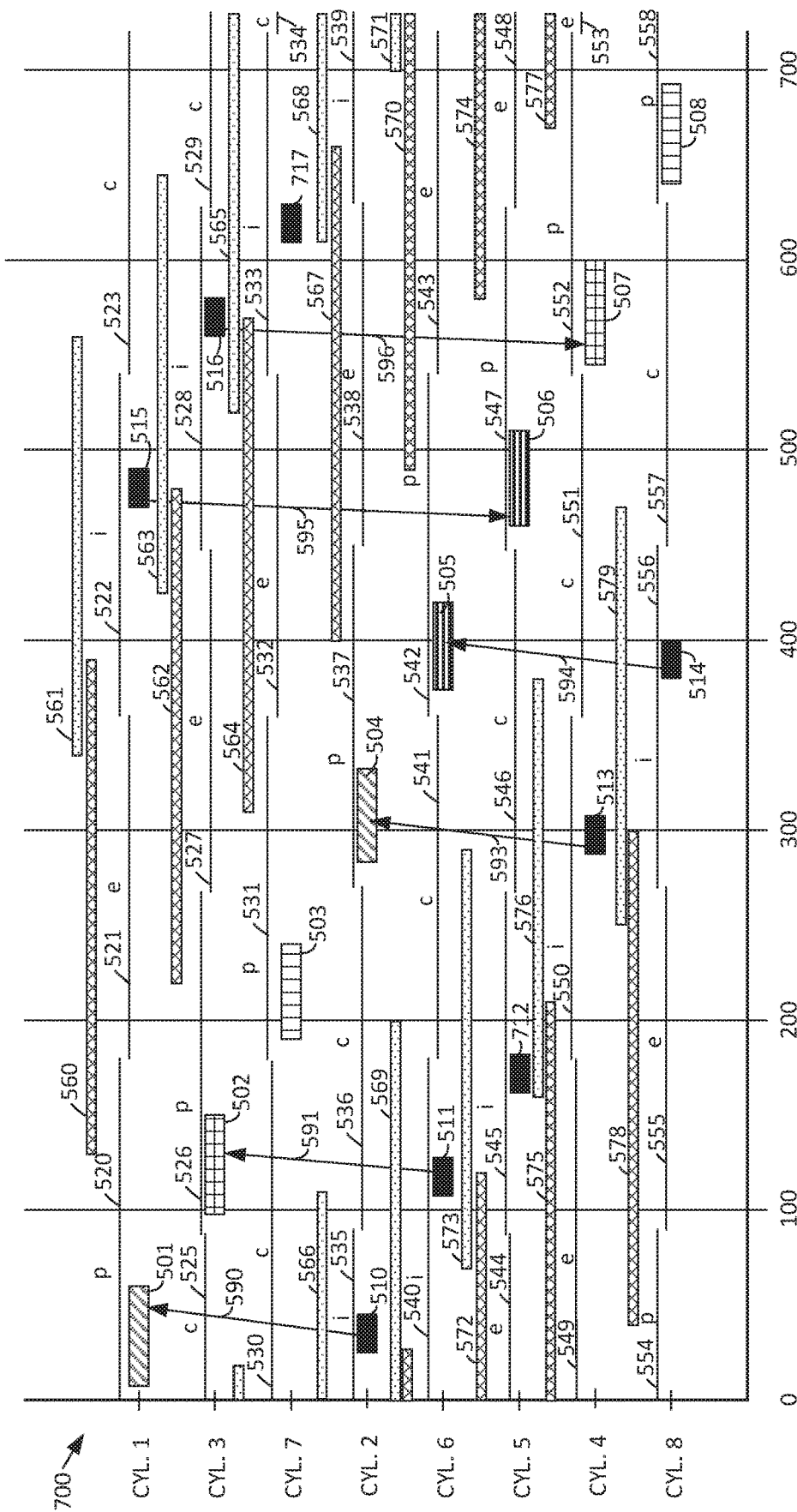
Figure 8:
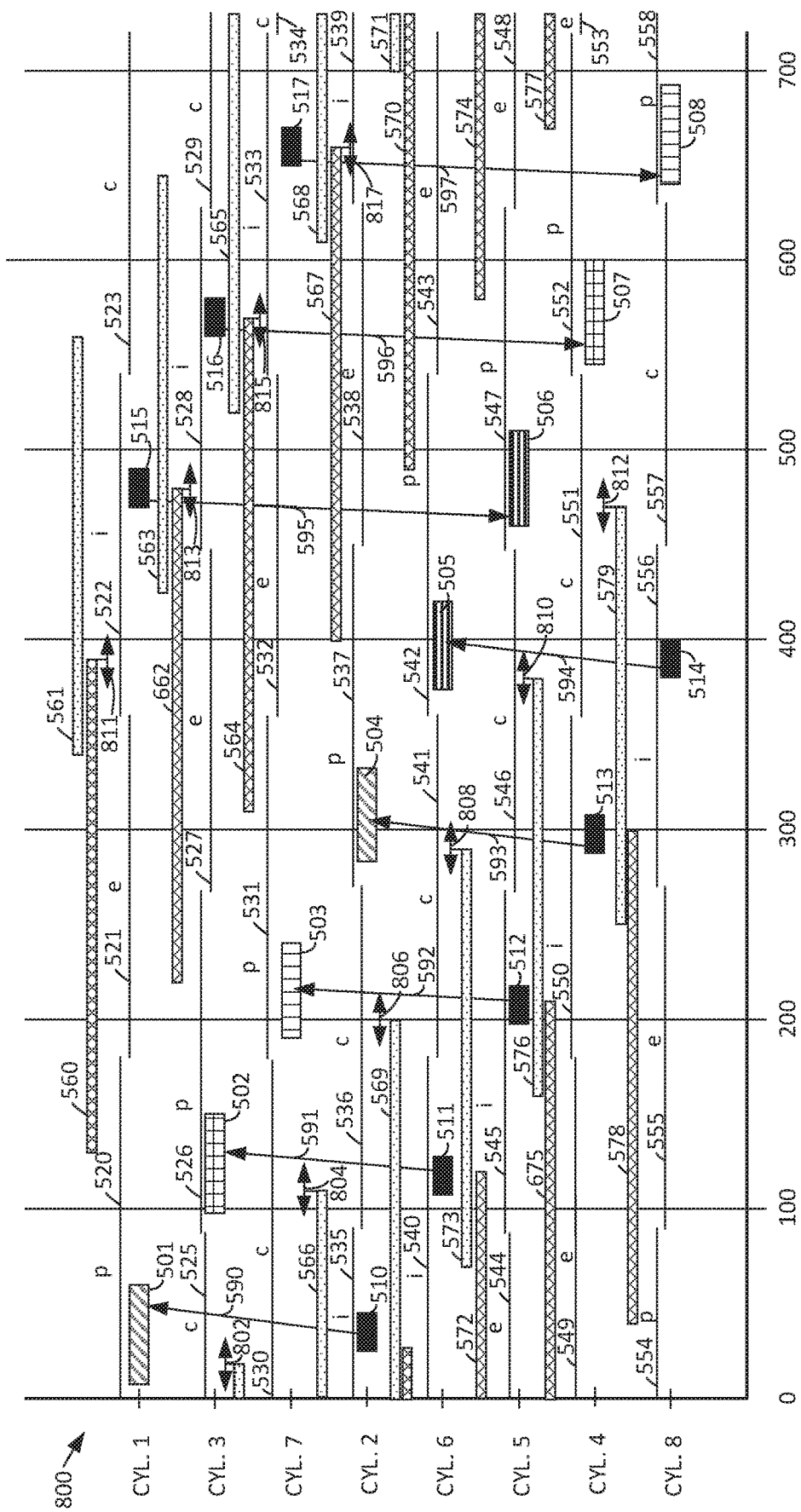

At 242, method 200 adjusts DI open/closing timing, PI open/closing timing, intake valve opening/closing timing, and/or exhaust valve opening/closing timing so that the engine knock background noise level may be lowered to improve the signal to noise ratio of knock sensor output to improve knock detection. The PI timing, DI timing, intake poppet valve timing, and exhaust poppet valve timing may be advanced or retarded to decrease noise in the engine knock window of the selected cylinder. An example of fuel injector timing adjustments is shown in FIG. 7. An example of poppet valve timing adjustments is shown in FIG. 8. Of course, the fuel injection timing and poppet valve timing adjustments may also be made to increase engine knock background noise levels in engine knock windows, if desired. Further, the fuel injection timing and poppet valve timing adjustments may be made to decrease engine noise levels in engine knock windows for other reasons (e.g., to verify engine knock background levels for other engine cylinders, etc.), if desired. Method 200 proceeds to 244 after adjusting injector and poppet valve opening and closing timings relative to crankshaft position.

At 244, method 200 determines engine knock background noise levels for the present engine operating conditions (e.g., engine speed, engine load, and engine operating mode) via filtering and integrating engine knock sensor output that occurs during the engine knock window of the selected cylinder. The integrated value may be an engine knock base noise level or another engine knock noise level. Further, the present engine knock background noise levels may be constructed from an average of a predetermined number of past engine knock background noise levels for the selected cylinder. Method 200 proceeds to 246 after engine knock background noise levels for the selected cylinder have been learned.

At 246, method 200 judges if an engine knocking rate of a selected cylinder or an actual total number of knock indications for the selected cylinder is less than the second threshold value for present engine speed and engine load. If method 200 judges that the engine knocking rate of the selected cylinder or an actual total number of knock indications for the selected cylinder is less than the second threshold value for present engine speed and engine load, then the answer is yes and method 200 proceeds to 248. Otherwise, the answer is no and method 200 proceeds to 208.

At 248, method 200 changes the knock sensor of the selected cylinder that is sampled or measured. The knock sensor is changed so that engine knock may be determined in the selected cylinder via a secondary knock sensor instead of a primary knock sensor that is associated with the cylinder. For example, if indications of knock in cylinder number one are less than the second threshold and cylinder number one is the selected cylinder, then knock sensor 90b may be sampled to determine knock in cylinder number one instead of knock sensor 90a. This may allow knock to be detected in cylinder number one even if the primary knock sensor of cylinder number one is degraded. Method 200 also learns engine knock background noise levels via sampling the output of the secondary knock sensor of the selected cylinder. Method 200 proceeds to 250.

At 250, method 250 assesses whether or not knock should be indicated for the selected cylinder based on output of the secondary knock sensor that is sampled during the knock window of the selected cylinder. Method 200 computes a knock intensity value for the selected cylinder by integrating sampled output of the knock sensor during the knock window of selected cylinder and dividing the integrated knock sensor output by the total engine knock background noise level for the selected cylinder as determined from output of the secondary knock sensor. If the knock intensity value exceeds a threshold value (e.g., 2), then knock is indicated for the selected cylinder and spark timing for the selected cylinder may be retarded by a predetermined amount. The spark is retarded for the selected cylinder and then the spark timing is advanced back toward the MBT (minimum spark advance for best engine torque at the present engine speed and load) spark timing for the selected cylinder. If knock is not indicated, spark timing for the selected cylinder remains at its requested or base timing (e.g., knock limited spark timing or MBT timing). Knock for each cylinder may be determined in this way. Method 200 proceeds to 208.

In these ways, the opportunities to learn engine knock background noise levels of each cylinder may be increased. Further, the selected cylinder mentioned in the description of method 200 may be incremented, decremented, or otherwise adjusted so that each cylinder of the engine may be the selected cylinder once during an engine cycle (e.g., two crankshaft revolutions). Further still, a knock sensor that is associated with a knock window of a cylinder may be changed to improve the possibility of knock detection during conditions of knock sensor degradation or other conditions when it may be desirable to do so (e.g., when comparing engine knock background noise levels of the various cylinders, performing engine diagnostics, etc.).

Figure 5:
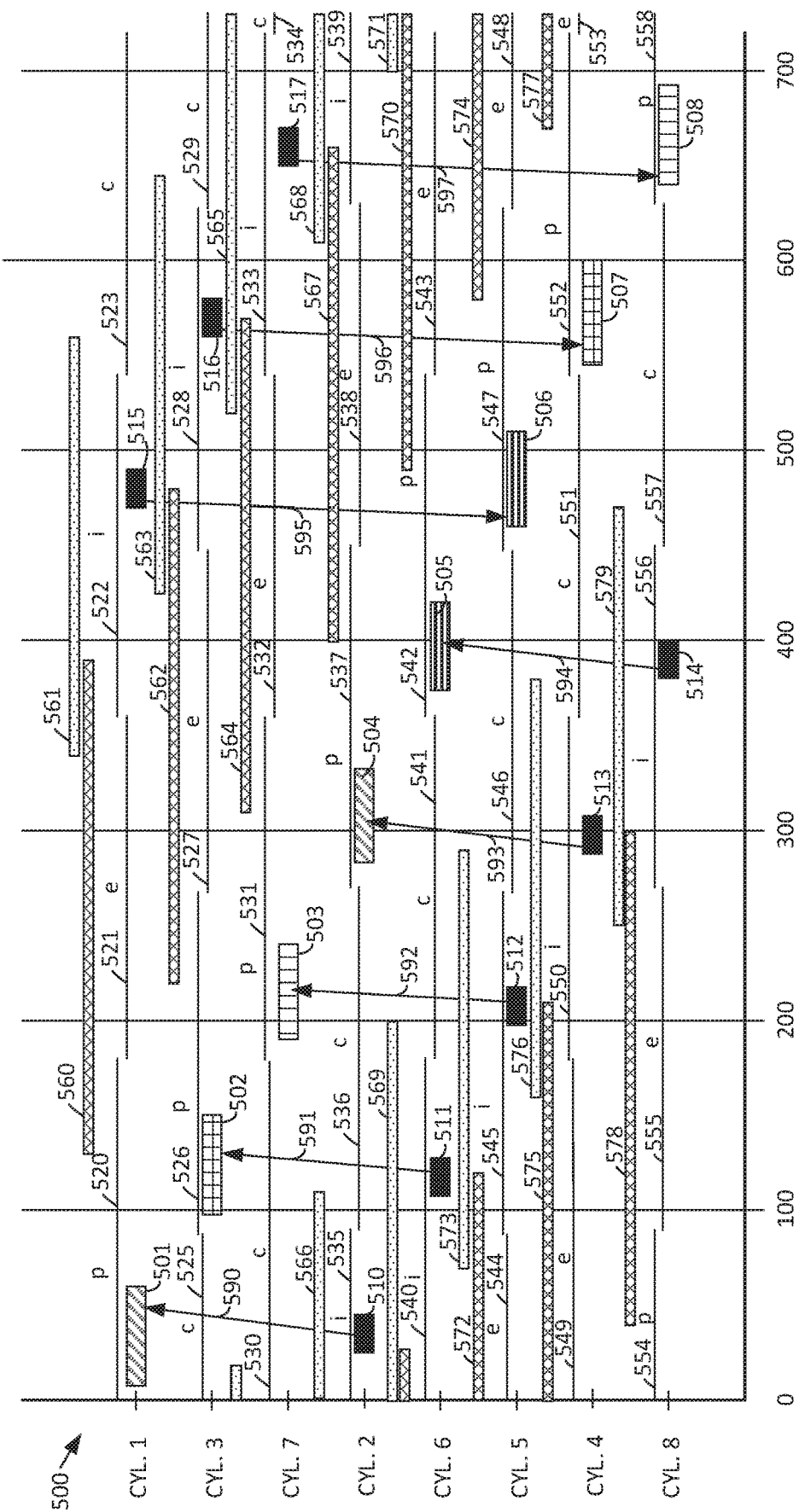
FIGS. 5-8 show example engine operating sequences according to the method of FIGS. 2-4.

Referring now to FIG. 5, a timing sequence 500 that illustrates example base engine knock window timing, direct injector timing, and intake and exhaust poppet valve opening and closing timing is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis. In this example, several engine knock background noise influences are shown visually by DI injections and poppet valve timings.

The engine knock windows for each cylinder are positioned at a level of a tick mark along the vertical axis that is associated with the knock window. For example, the engine knock window for or associated with cylinder number one is indicated by slash bar 501. Knock windows for the remaining engine cylinders (2-8) are indicated by bars (502-508) that align with labeling along the vertical axis. The controller may sample (e.g., measure) output of the knock sensor when a knock window of a cylinder is open. An open knock window is a crankshaft region where engine knock may be expected for a particular engine cylinder.

Knock window 501 includes a slash pattern that indicates that output of knock sensor 90a is sampled during the open knock window of cylinder number one. Knock window 504 includes the same slash pattern that indicates that output of knock sensor 90a is sampled during the open knock window of cylinder number two. Knock window 502 includes a plaid pattern that indicates that output of knock sensor 90b is sampled during the open knock window of cylinder number three. Knock window 507 also includes a plaid pattern that indicates that output of knock sensor 90b is sampled during the open knock window of cylinder number four. Knock window 506 includes a horizontal line pattern that indicates that output of knock sensor 90c is sampled during the open knock window of cylinder number five. Knock window 505 includes the same horizontal line pattern that indicates that output of knock sensor 90c is sampled during the open knock window of cylinder number six. Knock window 503 includes a vertical line pattern that indicates that output of knock sensor 90c is sampled during the open knock window of cylinder number seven. Knock window 508 also includes a vertical line pattern that indicates that output of knock sensor 90c is sampled during the open knock window of cylinder number eight. Thus, the knock sensor that is sampled during a particular knock window is indicated by the pattern contained within the knock window.

The engine fuel injection timings for each cylinder are positioned at a level the tick mark along the vertical axis that is associated with the fuel injection. For example, solid bar 510 represents a DI fuel injector open interval for cylinder number two. The DI fuel injector for cylinder number two is closed when solid bar 510 is not visible. The DI fuel injector for cylinder number two opens at the left side of solid bar 510 and closes at the right side of solid bar 510. DI fuel injections for the remaining engine cylinders (2-8) are indicated by similar solid bars (511-517) and they follow the same convention as solid bar 510. The fuel injector bars 510-517 respectively align with cylinders listed along the vertical axis that the fuel injector bars correspond to.

The strokes of a cylinder are positioned just above a level the tick mark along the vertical axis that is associated with the stroke. For example, strokes for cylinder number one are indicated by horizontal lines 520-523. Letters p, e, i, and c identify the power (p), exhaust (e), intake (i), and compression (c) strokes associated with cylinder number one. Strokes for the other engine cylinders are identified in a similar way by lines 525-558.

The exhaust valve timings for each cylinder are positioned above a level the tick mark along the vertical axis that is associated with the exhaust valve timings. For example, exhaust valve opening time for cylinder number one is indicated by cross-hatched bar 560. The exhaust valves for cylinder number one are closed when no cross-hatched bar is present above the cylinder strokes of cylinder number one. Exhaust valve opening times for the other cylinders are indicated at 562, 564, 567, 570, 572, 574, 575, 577, and 578.

The intake valve timings for each cylinder are positioned above a level the tick mark along the vertical axis that is associated with the intake valve timings. For example, intake valve opening time for cylinder number one is indicated by dotted bar 561. The intake valves for cylinder number one are closed when no dotted bar is present above the cylinder strokes of cylinder number one. The intake valve opening times for the other cylinders are indicated at 563, 565, 566, 568, 569, 571, 573, 576, and 579.

The engine noise observed in a knock window of one cylinder may include noise related to events associated with other engine cylinders. For example, the engine knock window of cylinder number two indicated at 504 may occur at a time when the knock sensor is exposed to noise from the DI injection to cylinder number four at 513 and this linkage is shown via arrow 593. The relations between DI injections to other cylinders and the knock sensor output in other knock windows are illustrated via arrows 590-597. Thus, the engine knock background noise level determined for the engine knock window of cylinder number two shown at 504 may include noise generated by the DI injector opening and/or closing at 513. In addition, the intake valve closing of cylinder number five indicated by dotted bar 573 show that the intake valve of cylinder number five closes and may generate noise within the time that the knock window of cylinder number two is open as shown by bar 504. Further, the exhaust valve closing of cylinder number eight indicated by dotted bar 578 shows that the exhaust valve of cylinder number eight closes and may generate noise within the time that the knock window of cylinder number two is open as shown by bar 504. Further still, the exhaust valve opening of cylinder number seven indicated by bar 564 shows that the exhaust valve of cylinder number seven opens and may generate noise within the time that the knock window of cylinder number two is open as shown by bar 504. Thus, in this example, engine background noise as determined via the engine knock window for cylinder number two at 504 may include noise from DI event 513, valve event 573, valve event 564, and valve event 578.

The poppet valve and DI injection times shown in FIG. 5 may be indicative of base DI and poppet valve timings. These timings may affect the engine background noise levels determined from engine knock windows of the cylinders (e.g., 504). While it may be desirable to include all background noise sources to determine a background noise level for a particular cylinder, it may also be useful to decompose a total background noise level into the contributions from individual noise sources. By removing one or more noise influences from a total engine background noise level, it may be possible to determine engine noise levels that may be used to determine whether or not knock is present in other cylinders. For example, a base engine knock background noise level for cylinder number one may be used as a base engine knock background noise level for cylinder number three. Further, the poppet valve noise or DI injector noise of one cylinder may be applied to a different cylinder to estimate engine knock background noise for the different cylinder. Such allocations of engine knock background noise levels may be useful when an engine knock background noise level has not been observed for a particular engine cylinder or if opportunities for learning engine knock background noise levels is limited by vehicle operating conditions. Output of a knock sensor may be sampled (e.g., measured) via the controller and processed when a knock window is open as shown at windows 501-508.

Figure 6:
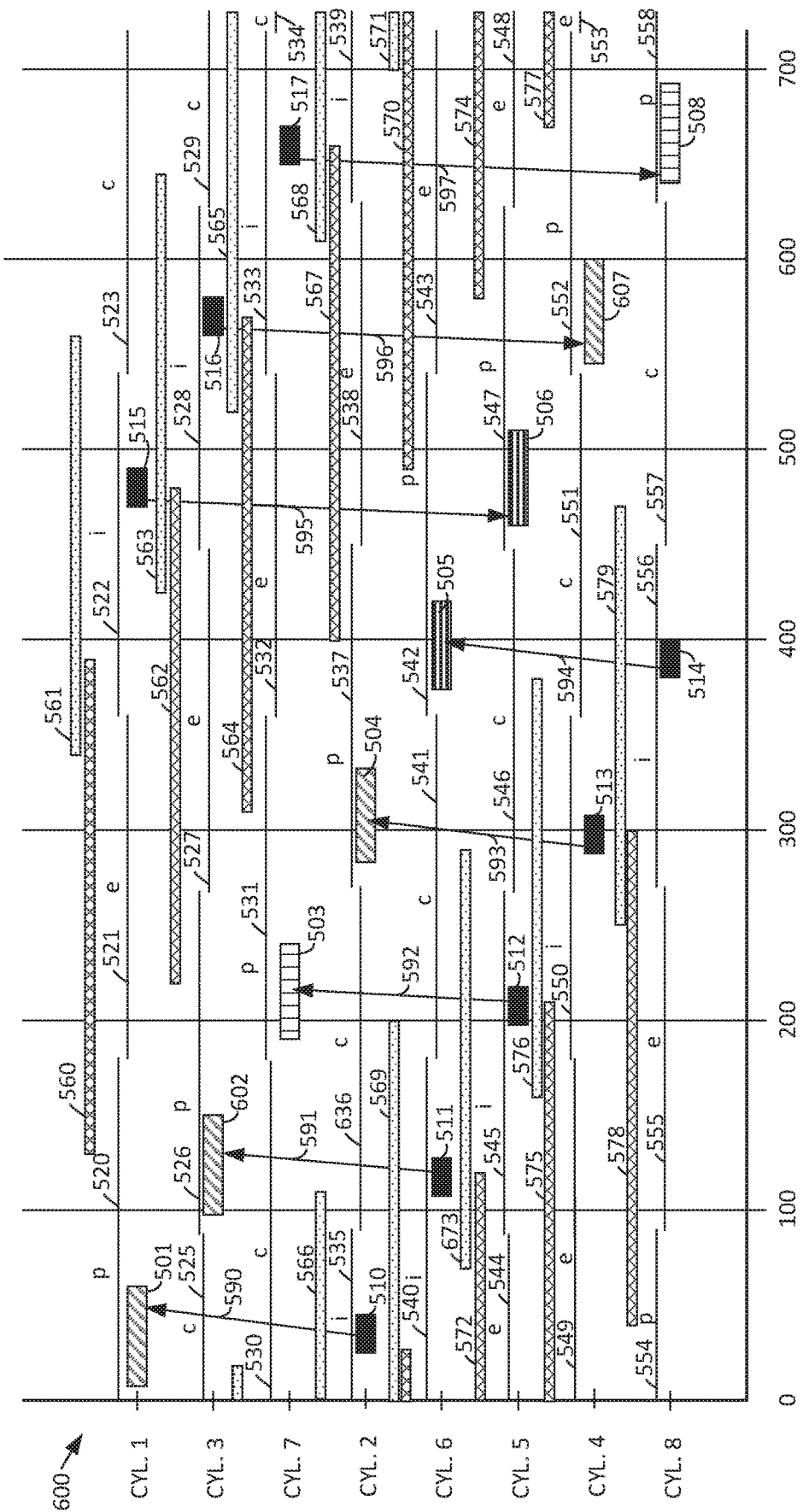

Referring now to FIG. 6, a timing sequence 600 that illustrates one way of changing a knock sensor that is sampled during a cylinder's knock window is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis.

The fuel injections, valve timings, cylinder strokes, and engine position for each of the cylinders shown in FIG. 6 are identical to those shown in FIG. 5, except as noted below. Therefore, for the sake of brevity, the description of these items will not be repeated. Nevertheless, the timings and sequence shown in FIG. 6 is identical to that shown in FIG. 5, except as noted.

In this example, output of knock sensor 90a is sampled or measured via the controller during the knock windows of cylinder numbers three and four. Thus, knock windows for cylinder numbers three and four have been revised to 602 and 607 to indicate that output of a different knock sensor is sampled during the knock windows of cylinder numbers three and four. In this example, the knock sensor that is sampled in the knock windows of cylinder numbers three and four is switched when degradation of knock sensor 90b is suspected.

Engine knock background noise levels for cylinder numbers three and four may also be relearned when output of one knock sensor sampled during the knock windows of cylinder numbers three and four is replaced by output of a second knock sensor sampled during the knock windows of cylinder numbers three and four. In this way, the engine background noise level for cylinder numbers three and four may be adjusted according to output of the knock sensor that is sampled during the knock windows of cylinder numbers three and four. This may improve detection of knock in cylinder numbers three and four. This sequence only shows changing from a primary knock sensor to a secondary knock sensor for cylinder numbers three and four, but knock sensors sampled in knock windows of other cylinders may be changed in a similar way.

Referring now to FIG. 7, a timing sequence 700 that illustrates one way of changing fuel injection timing to adjust engine knock background noise levels during a cylinder's knock window is shown. The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis.

The fuel injections, valve timings, cylinder strokes, and engine position for each of the cylinders shown in FIG. 7 are identical to those shown in FIG. 5, except as noted below. Therefore, for the sake of brevity, the description of these items will not be repeated. Nevertheless, the timings and sequence shown in FIG. 7 is identical to that shown in FIG. 5, except as noted. In this example, timing of direct fuel injections for cylinder numbers seven and five are adjusted to reduce an amount of engine knock background noise in the knock windows of cylinder numbers seven and eight. Specifically, timings of injections 712 and 717 are advanced so that direct fuel injectors do not close during knock windows 503 and 508 of cylinder numbers seven and eight. The fuel injector timings may be adjusted to increase the signal to noise ratio of knock sensor output so that identification of engine knock may be improved.

Engine knock background noise levels for cylinder numbers seven and five may also be relearned when fuel injection timings (e.g., fuel injector opening and closing times or crankshaft angles) are adjusted so that identification of engine knock accuracy may improve. In this way, the engine background noise level for cylinder numbers seven and five may be adjusted according to engine noise that may occur during the knock windows of the cylinders. This may improve detection of knock in cylinder numbers seven and five. This sequence only shows fuel injector adjustments for two cylinders, but fuel injection of all engine cylinders, one engine cylinder, or other numbers of cylinders may be adjusted in a similar way.

Referring now to FIG. 8, a timing sequence 800 is shown that illustrates intake and exhaust valve closing timing adjustments that may be made to reduce engine knock background noise levels for engine cylinders. The valve timings may be adjusted to allow the determination of the total cylinder background noise level for cylinder i at the present engine speed and load Cyl_bkg_noise(i), the base cylinder background noise level that does not include noise from fuel injectors and/or intake and/or exhaust poppet valves that open and/or close during a knock window of cylinder (i) Cyl_base_noise (i), the fuel injector noise that occurs during a knock window of cylinder (i) Cyl_inj_noise (i), and the noise from intake/exhaust valves that open and/or close during a knock window of cylinder (i) Cyl_v-lv_noise (i).

The fuel injections, valve timings, cylinder strokes, and engine position for each of the cylinders shown in FIG. 8 are identical to those shown in FIG. 5, except as noted below. Therefore, for the sake of brevity, the description of these items will not be repeated. Nevertheless, the timings and sequence shown in FIG. 8 is identical to that shown in FIG. 5, except as noted.

The illustrated timings are for an eight cylinder engine that has a firing order of 1-3-7-2-6-5-4-8. The engine is a four stroke engine that has a cycle of 720 crankshaft degrees. The engine crankshaft degrees are located along the horizontal axis and zero degrees represents top-dead-center compression stroke for cylinder number one. The eight cylinders are labeled along the vertical axis Intake closing time adjustments may be made as shown at 802, 804, 806, 808, 810, and 812 to lower the engine knock background noise levels that may be observed in knock windows 501, 502, 503, 504, and 506. Specifically, intake valve closing event times or crankshaft angles may be adjusted so that the intake valves do not close when a knock window is open. Further, exhaust closing time adjustments may be made as shown at 811, 813, 815, and 817 to lower the engine knock background noise levels that may be observed in knock windows 505, 506, 507, and 508. Specifically, exhaust valve closing event times or crankshaft angles may be adjusted so that the exhaust valves do not close when a knock window is open. Of course, engine knock background noise of engine cylinders may be increased via moving poppet valve closings into knock windows of engine cylinders.

Engine knock background noise levels for the engine cylinders may also be relearned when poppet valve opening and closing timings are adjusted so that identification of engine knock accuracy may improve. In this way, the engine background noise level for the engine cylinders may be reduced if engine knock background noise levels become larger as the engine ages. This may improve detection of knock in the engine cylinders.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   sampling an output of a first knock sensor in a knock window of a selected cylinder via a controller; and
   sampling an output of a second knock sensor in the knock window of the selected cylinder via the controller in response to generating less than a threshold total number of engine knock indications from sampling of the first knock sensor in the knock window of the selected cylinder.

2. The method of claim 1, where the first knock sensor is positioned physically closer to the selected cylinder than the second knock sensor, and where the output of the first knock sensor is not sampled in the knock window when the output of the second knock sensor is sampled in the knock window.

3. The method of claim 1, further comprising generating a knock intensity value via output of the first knock sensor.

4. The method of claim 1, further comprising generating a knock intensity value via output of the second knock sensor.

5. The method of claim 1, further comprising indicating engine knock via output of the first knock sensor and a first engine knock background noise level.

6. The method of claim 5, further comprising learning a second engine knock background noise level after changing from sampling the first knock sensor in the knock window of the selected cylinder to sampling the second knock sensor in the knock window of the selected cylinder.

7. The method of claim 6, further comprising indicating engine knock via output of the second knock sensor and the second engine knock background noise level.

* * * * *